March 26, 1935.  J. O. ARMSTRONG  1,995,560
MAGNETIC MEANS FOR CONTROLLING AN ELECTRIC ARC
Filed April 14, 1932  2 Sheets-Sheet 1
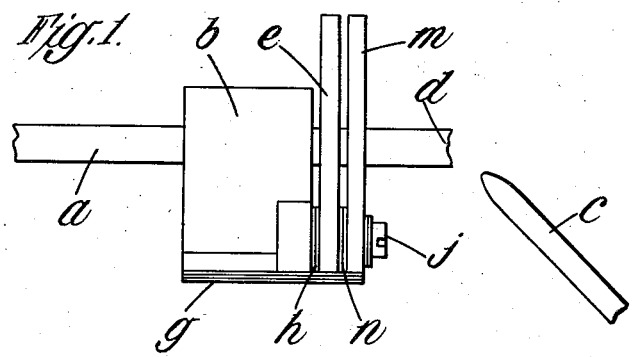
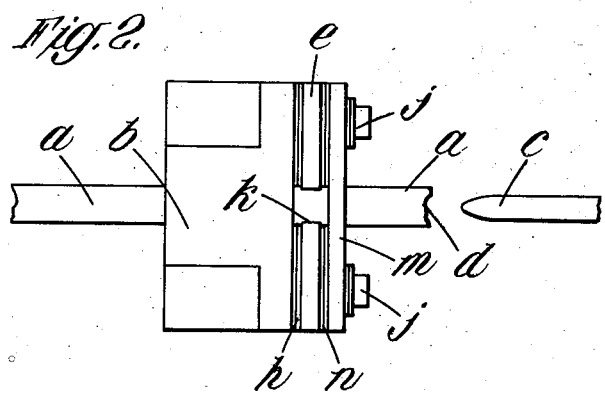
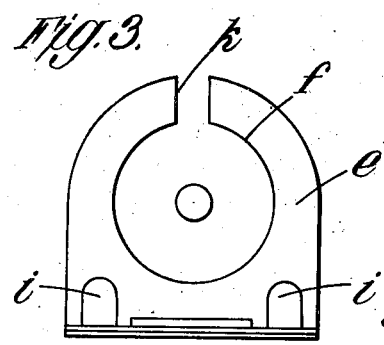
Inventor:
James Ogle Armstrong.
Attorney:

March 26, 1935.    J. O. ARMSTRONG    1,995,560
MAGNETIC MEANS FOR CONTROLLING AN ELECTRIC ARC
Filed April 14, 1932    2 Sheets-Sheet 2
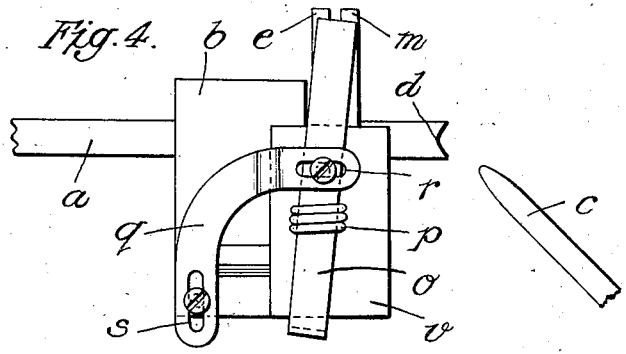
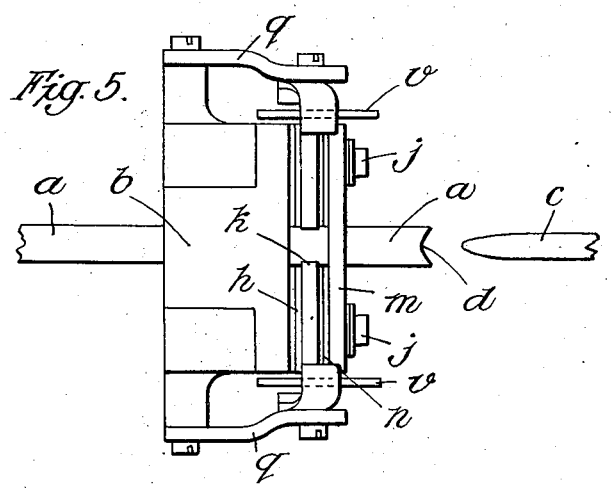
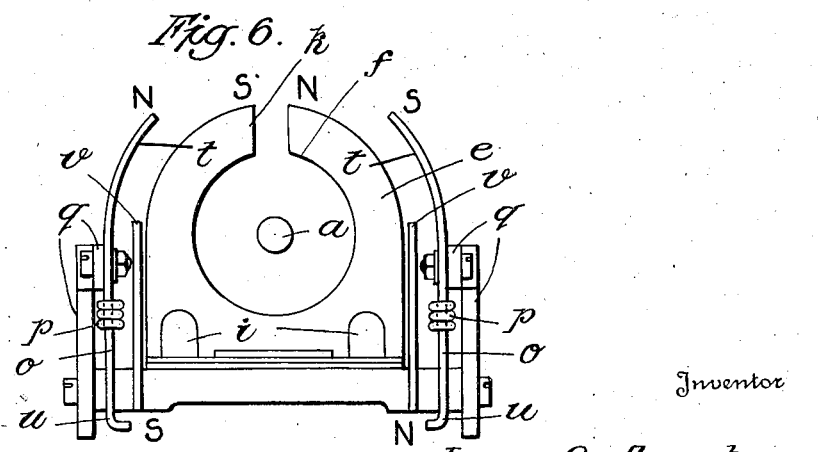
Inventor
James O. Armstrong, Patented Mar. 26, 1935

1,995,560

UNITED STATES PATENT OFFICE 1,995,560

MAGNETIC MEANS FOR CONTROLLING AN ELECTRIC ARC

James Ogle Armstrong, East Finchley, London, England

Application April 14, 1932, Serial No. 605,286 In Great Britain April 17, 1931

5 Claims. (Cl. 176—118)

In electric arc lamps adapted for burning carbons, an increase in efficiency may be effected by means of an arc control such as a magnetic circuit or a discontinuous ring of magnetic material of relatively large diameter and having a relatively large gap which has in some cases been employed to encircle the arc flame in a plane between the two electrodes, and known as an arc-heater.

With the object of further increasing the efficiency of a projection arc lamp, and in accordance with the present invention, an apertured plate of iron is disposed in the rear of the arc-crater so that the positive carbon passes clear through the aperture therein said plate having a relatively narrow gap above said carbon.

Preferably the apertured plate, which may be of soft charcoal iron, and substantially rectangular, is formed with a central aperture through which the positive carbon passes coaxially.

The invention will be described with reference to the accompanying drawings, of which Fig. 1 is a side elevation of a portion of an arc lamp; Fig. 2 is a plan view thereof;

Fig. 3 is a front elevation of the plate showing its position relative to the positive carbon; and Figs. 4, 5 and 6 are views corresponding to Figs. 1, 2 and 3 respectively, but showing a modification of the invention.

As shown in the drawings, the positive carbon $a$ extends through an electrical contact block $b$ to meet the negative carbon $c$, an arc being established between the two carbons $a$ and $c$ and a crater being formed in the end of the positive carbon $a$ as at $d$.

At that end of the contact block $b$ adjacent to the crater $d$ is disposed a plate $e$ of soft charcoal iron which is arranged in a plane transversely of the carbon $a$, being apertured centrally as at $f$ to permit the passage of said carbon $a$ coaxially therethrough. The plate $e$ rests upon the usual insulation $g$ of the contact carrier (not shown) and is spaced from the contact block $b$ by means of insulating strips such as $h$ whilst slots $i$ are formed in the lower edge of said plate $e$ to span insulated clamping screws $j$ which serve to secure the plate $e$ to the block $b$.

The top of the plate $e$ is rounded concentrically with the aperture $f$ and a slot $k$ is formed directly above the carbon $a$.

A plate $m$ of nickel (or other comparatively non-magnetic and heat resisting material of substantially similar shape to the plate $e$) is arranged immediately in front of the latter, but spaced therefrom by means of a separating piece of iron or heat resisting metal $n$, the screws $j$ serving to secure both the plates $e$ and $m$ in position.

The dimensions of the plate $e$, the aperture $f$, the slot $k$ and the distance of the plate $e$ from the crater $d$ vary with the size and type of the carbon $a$, and with the type and value of the electric current employed and in order to obtain maximum efficiency, it may be necessary to resort to experiment.

The following is given by way of example:

With a high intensity positive carbon of a diameter of 13.6 m/m. taking a current of approximately 135 amperes and using a direct current supply, the thickness of the plate should be ⅜ of an inch, the width of the slot should be ½ inch, and the diameter of the aperture should be from 2 to 2⅜ inches. When a rectified single phase alternating current is used, the thickness of the plate should be ⅛ of an inch, the width of the slot ½ inch, and the diameter of the aperture 2⅜ inches. When a rectified 3-phase alternating current is used, the thickness of the plate should be ⅜ of an inch, the width of the slot ½ inch, and the diameter of the aperture from 2⅛ to 2¼ inches.

When using a high intensity positive carbon of a diameter of 12 m/m. taking a direct current of 100 amperes, the thickness of the plate should be from ⅛ to 1/32 of an inch, the width of the slot should be ½ inch, and the diameter of the aperture should be from 2 to 2⅜ inches.

Too small an aperture is undesirable as militating against efficiency and tending to cause the arc flame to be attracted towards the plate $e$, whilst too large an aperture results in a weakened magnetic field in said plate.

The overall size of the plate $e$ is determined by the diameter of the carbon, electrical current used, and constructional considerations, whilst its distance from the crater is determined by magnetic considerations, the heating effect of the arc on the plate, and mechanical expediency; an average for the latter distance being about 1¾ to 2 inches under normal conditions at the present time.

An arc control of the kind described may be used in conjunction with two electro-magnets arranged substantially vertically one at each side of the positive electrode and substantially in the same general plane as the apertured plate, the magnetic flux between the poles of each of said electro-magnets being arranged to flow in the general direction of that in the adjacent part of said apertured plate.

Preferably the electro-magnets are so mounted as to be capable of limited movements in the direction of their lengths and also in the direction of, and angularly about, axes parallel with that of the positive electrode.

Each electromagnet has a core, the upper part of which is preferably bent so as to be substantially coaxial of the positive electrode, whilst its lower part may be bent near its lower extremity at right angles towards the median plane of the lamp.

The approximate suitable dimensions for the arrangement which may be used are as follows: The distance between the poles of each magnet core may be from 4 to 6 inches, the width of the core ¾ of an inch, the thickness of the core (at right angles to the electrode) 3/16 of an inch, the distance between the upper poles of the magnets from 4 to 6 inches, the distance between the center lines of the magnets 5½ inches, and the height of the upper poles of the magnet above the electrode from 1 to 2 inches.

The windings of the electromagnets may be as follows:

| + electrode | − electrode | Ampere turns |
| --- | --- | --- |
| 11 m. m. | 9 m. m. | 255 to 270 |
| 12 m. m. | 9 or 10 m. m. | 300 to 330 |
| 13.6 m. m. | 11 m. m. | 250 to 320 |

Viewing the arrangement from the front of the crater, the left hand electromagnet should have an upper pole which is N and a lower pole S, and the right hand electromagnet should be just the opposite, namely, the upper pole should be S and the lower pole should be N.

As shown in Figs. 4, 5 and 6, two electromagnets are provided. These electromagnets are comprised of cores o and windings p. The electromagnets are mounted upon brackets q which are carried by the front contact b of the lamp. The brackets q are slotted as at r and s so as to enable the positions of the electromagnets to be adjusted vertically and horizontally.

If desired, means (not shown) may also be provided for adjusting the electromagnets angularly about axes parallel with that of the positive carbon a, but such movement is not usually necessary.

The front edges of the cores o normally lie in a plane about 1⅞ inches behind the crater d, that is to say, substantially in a line with the central plane of the apertured plate e. Generally speaking, about ½ inch is sufficient to cover any adjustment which may be necessary. If desired, however, the electromagnets may be capable of adjustment so that the front edges of the cores o may be between 1 and 2½ inches from the crater d. The upper portions of the cores o are bent towards each other around the positive carbon a as at t, while their lower ends u are bent towards each other at right angles.

For some unknown reason, the use of the slotted iron plate e produces an increase in the brilliancy of the arc, that is, an increased whiteness of the light. This is possible because the magnetic field set up increases the intensity of combustion in the crater and increases the proportion of blue in the light produced. The increase in intensity becomes greater as the plate is moved towards the crater of the positive carbon. This distance, however, is limited first by reason of the heat of the crater and its effect on the metal, and second, because the flame of the arc is attracted towards the plate e in proportion to its proximity to the crater. The flame is drawn towards the gap k and the width of the flame tends to vary with the width of said gap.

The attraction of the flame by the plate e is decreased as the diameter of the aperture f is increased, but such increase in diameter reduces the effect of the plate.

The employment of electromagnets, as set forth above, enables the arc flame to be blown away from the plate e, and thus permits the latter to be moved nearer to the crater, consequently increasing its effect. By suitably adjusting the characteristics of the plate e and the electromagnets and their positions relative to each other, and to the position of the crater, a great increase in the brilliancy of a light may be obtained while the flame may be caused to assume and retain a concentrated form extending vertically above the crater.

By means of this invention the arc-flame of an electric arc lamp may be stabilized in a vertical position and narrow formation of particularly good intensity and colour whilst the crater end of the positive electrode is maintained very nearly flat and perpendicular to the axis of the electrode even though the negative electrode be slightly out of alignment.

I claim:—

1. Means for controlling an electric arc comprising a plate of iron apertured for the passage of the positive carbon and arranged in the rear of the arc crater and having a relatively narrow gap above said carbon, in combination with a pair of electro-magnets arranged one on each side of the positive electrode, said electromagnets being adjustably mounted for limited movements in the direction of their lengths and also in the direction of, and angularly about, axes parallel with that of the positive electrode.

2. Means for controlling an electric arc comprising a plate of iron apertured for the passage of the positive carbon and arranged in the rear of the arc crater and having a relatively narrow gap above said carbon, in combination with a pair of electro-magnets arranged one on each side of the positive electrode, the cores of said electro-magnets being bent at their upper ends so as to be substantially coaxial with the positive electrode and near their lower ends at right angles towards the median plane of the lamp.

3. Means for controlling an electric arc as claimed in claim 1, wherein the upper ends of the cores of the electro-magnets are bent towards one another in a circular curve, whilst the lower ends of said cores are bent towards one another at right angles.

4. In an arc lamp, the combination of means for controlling the electric arc, said means comprising a plate of iron provided with an aperture and disposed to the rear of the crater of the arc, the positive carbon of the arc lamp passing through said aperture, said plate having a relatively narrow gap above said carbon, and a pair of electromagnets arranged substantially vertically one at each side of the positive electrode and substantially in the same general plane as said apertured plate, said electromagnets being connected so that the magnetic flux between the poles of each thereof flows in the general direction of that of the adjacent part of said apertured plate.

5. In an electric arc lamp, means for controlling the electric arc comprising a plate of iron provided with an aperture and disposed in the rear of the crater of the arc, the positive carbon of the arc lamp passing through said aperture, said plate having a relatively narrow gap above said carbon, and a pair of electromagnets, said electromagnets being positioned one on each side of the positive electrode and adjacent the apertured plate.

JAMES OGLE ARMSTRONG.